April 27, 1943.　　A. B. FREEMAN　　2,317,900
SAFETY FISH HOOK
Filed April 23, 1942
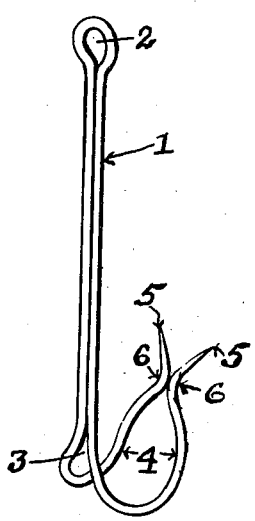
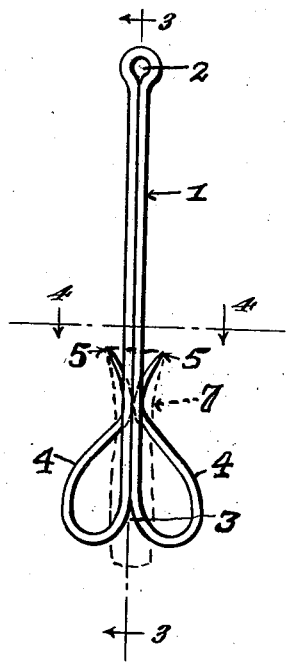
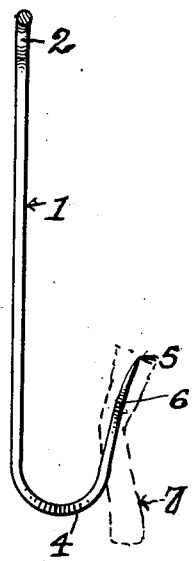
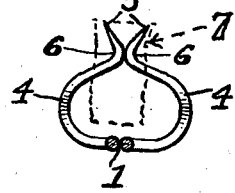
Inventor,
Alfred B. Freeman.
By E. E. Vrooman & Co.,
His Attorneys.

Patented Apr. 27, 1943

2,317,900

UNITED STATES PATENT OFFICE 2,317,900

SAFETY FISHHOOK

Alfred B. Freeman, San Diego, Calif.

Application April 23, 1942, Serial No. 440,240

1 Claim. (Cl. 43—27)

This invention relates to a safety fish hook that is not provided with barbs, although possessing all of the advantages of a barbed hook, without its disadvantages.

An object of the invention is the construction of a fish hook which will efficiently retain the bait, as well as retain the fish when it has been hooked.

Another object of the invention is the construction of a fish hook which will retain the bait up around the points, instead of permitting the bait to be washed down into the bight, thereby increasing the possibility of the fish becoming hooked.

A still further object of the invention is the construction of a novel hook which if caught in the person or clothes can be removed without surgery or injury to the fabric.

Another object of the invention is the production of a hook which is twice as strong as a simple barbed hook of equal size.

With the foregoing and other objects in view, my invention comprises certain novel constructions, combinations, and arrangements of parts as will be hereinafter fully described, illustrated in the accompanying drawing, and more particularly pointed out in the appended claim.

In the drawing:

Figure 1 is a perspective view of a hook constructed in accordance with the present invention, while Figure 2 is a view in rear elevation of the same.

Figure 3 is a vertical sectional view taken on line 3—3, Figure 2, and looking in the direction of the arrows.

Figure 4 is a horizontal sectional view taken on line 4—4, Figure 2 and looking in the direction of the arrows.

Referring to the drawing, in which the preferred embodiment of this invention is illustrated, the hook is preferably constructed of a single piece of material, such as a piece or strip of relatively resilient wire. The hook comprises a double shank or stem 1, which has at its upper end an eye 2, whereby the lead or fish line can be attached. The lower end of the double shank is of an inverted Y-shape construction at 3. The lower ends of the Y 3 terminate in the two hook units 4. Each hook unit 4 is outwardly bowed its entire length, terminating in a sharp end or point 5. The inner ends of points 5 abut or engage at 6—6.

The bait 7 (dotted lines) is held up in place by the outwardly bowing of hook units 4, and points 5 prevent the bait from being washed down on the hok units in a lump in the bight, as well as being greatly guarded against small fish from nibbling at the bait and thereby removing it from the hook, as is the case with an ordinary fish hook. Further, by this peculiar construction the gristle or skin, constituting bait 7, will be entrapped in the space between the outwardly bowed hook units 4, thereby preventing fish from shaking the bait loose.

When a fish is hooked, his weight and struggle against the line and hook will double puncture him, causing the points 5 to spread at 6 and entrap the cartilage in the narrow loop 4. As struggle towards 6 (upward towards the line) would merely slacken the line, without resistance, the juncture 6—6 will not reopen and the fish could not shake free. If the fish is caught in the thin cartilage, he could not rip a gap and shake the hook loose, as there would be a double slit, and therefore, a strip of cartilage entrapped in 4. Most fish escape by shaking the single prong through the torn gap of thin cartilage when they manage to get slack line.

Having no barbs, my device can be easily removed from the flesh of a person or from clothes when accidentally hooked into same, which is not true of the old ordinary hook provided with a barb.

While I have described the preferred embodiment of my invention and illustrated the same in the accompanying drawing, certain minor changes or alterations may appear to one skilled in the art to which this invention relates, during the extensive manufacture of the same, and I, therefore, reserve the right to make such alterations or changes as shall fairly fall within the scope of the appended claim.

What I claim is:

In a barbless hook consisting of a single piece of resilient material and having a double unit shank, said shank being provided at its lower end with an inverted Y structure, said Y structure forming part of outwardly-curved hook units, said hook units normally contacting only at their outer ends, and said contacting ends terminating in outwardly-extending sharpened portions, substantially as shown and described.

ALFRED B. FREEMAN.